United States Patent Office 3,577,218
Patented May 4, 1971

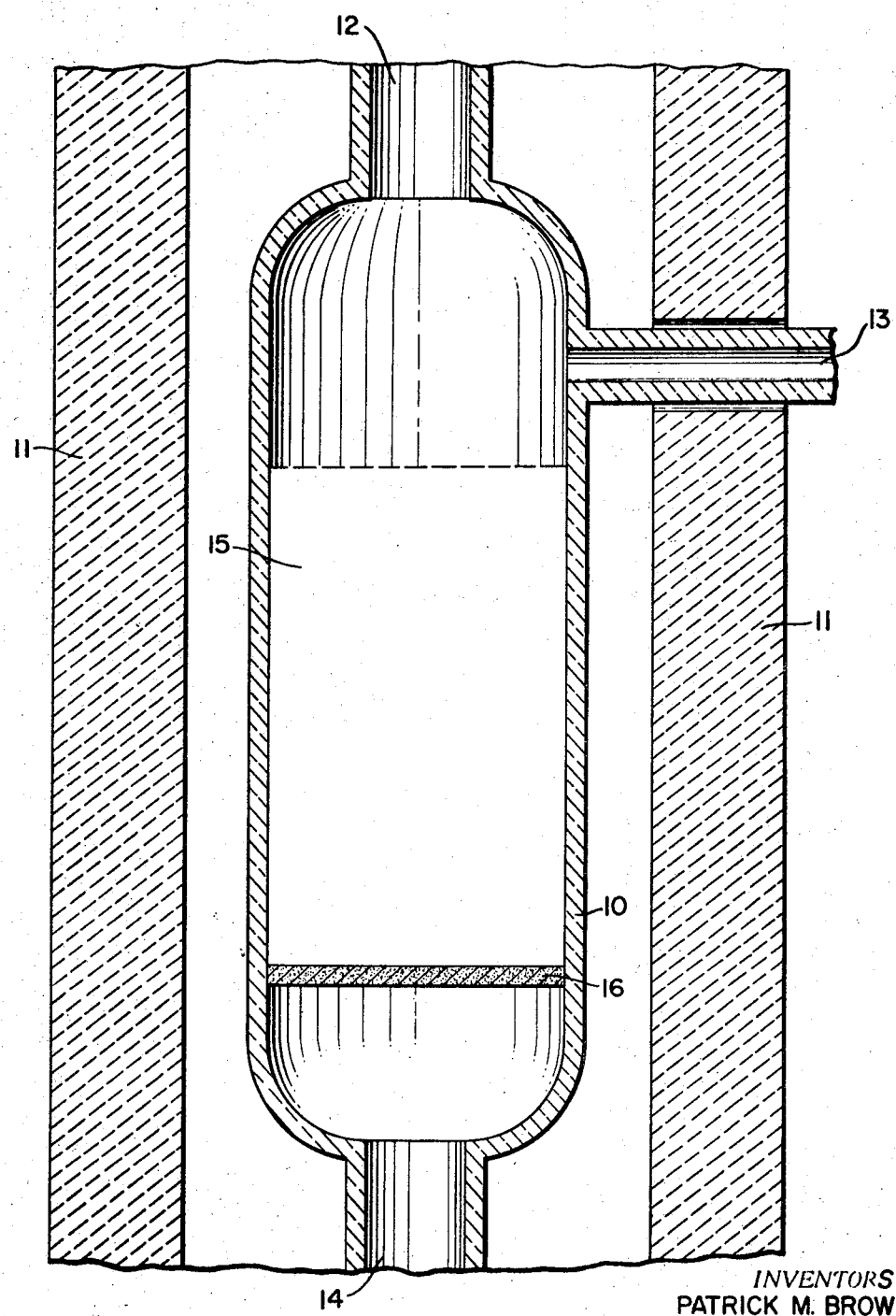
INVENTORS
PATRICK M. BROWN
HEYMAN C. DUECKER

3,577,218
METHOD FOR THE PRODUCTION OF HYDROGEN CYANIDE WHEREIN PLATINIZED MULLITE SERVES AS A CATALYST
Patrick M. Brown, Catonsville, and Heyman C. Duecker, Rockville, Md., assignors to W. R. Grace & Co., New York, N.Y.
Filed Aug. 28, 1968, Ser. No. 755,938
Int. Cl. C01c *3/02;* B01j *9/04*
U.S. Cl. 23—151                                        3 Claims

ABSTRACT OF THE DISCLOSURE

A mixture of ammonia and methane is reacted over platinized mullite catalyst to give high yields of hydrogen cyanide. The catalyst is prepared by depositing platinum on either natural or synthetic mullite; it possesses improved stability and avoids the problem of carbonitridation frequently encountered in use of alumina as a catalyst support in the production of hydrogen cyanide.

BACKGROUND OF THE INVENTION

Hydrogen cyanide is generally prepared by conversion of a nitrogen containing gas and a hydrocarbon with or without a source of oxygen over a suitable catalyst. The bulk of the hydrogen cyanide is prepared by one of two catalytic processes. In the first of these processes, hydrocarbon and a source of nitrogen such as ammonia are passed through ceramic tubes containing platinum as the catalyst. No air is added to the reaction mixture. In the second of these processes, air is added with the reaction mixture and the reactants are heated to a temperature of 1000° C. in the presence of platinum gauze as a catalyst. This method is disadvantageous in that the product produced contains water. In addition, large quantities of platinum are required with the attendant high cost.

The reaction in the absence of oxygen using platinum on ceramic tubes as a catalyst has certain advantages over the process where the catalyst is platinum sponge in that small quantities of platinum are required and the product is anhydrous. However, problems are encountered in this process in that the catalyst tends to become carbonized at high temperatures in the absence of oxygen. The alumina tubes slowly convert to aluminum nitride due to carbonitridation. The nitride formed acts as a catalyst for the ammonia decomposition prior to its contact with the hydrocarbon gas such as methane. As a result, high quantities of ammonia are required to prevent coking.

Coking may be diminished by employing a high surface area highly active catalyst which operates at lower temperatures. Platinum on high surface area alumina give satisfactory results. However, the alumina tends to sinter with occlusion and loss of platinum. In addition, the alumina again tends to be converted to the aluminum nitride.

We have found that a very satisfactory catalyst for the preparation of hydrogen cyanide can be prepared by depositing platinum from chloroplatinic acid on granular mullite and converting the platinum to the metal. The platinum may be alloyed with other metals in an amount of up to 20 percent of the metals' content if desired. The mullite base is a very stable base. It does not have the problems inherent in use of alumina as the catalyst base. The alumina in the mullite is bound into the structure in such a manner that there is no tendency for nitride formation. In addition, it retains high surface area over prolonged periods of time without sintering and encapsulating the platinum. When a mixture of ammonia and methane is passed over a catalyst comprising a base coated with the platinum or platinum alloys, the yield of hydrogen cyanide from ammonia, as observed over many days of continuous operation, reaches a peak shortly after the start of the operation and thereafter continues to fall off over a period of several days until it is no longer economical to continue with the catalyst in the spent condition. Accordingly, the reaction is normally stopped at some predetermined level of yield. The spent catalyst is reactivated by burning off the coke so that when operations are renewed, the yield of hydrogen cyanide will again obtain a high level. Because of the high stability of the mullite, the platinum catalyst on the mullite base does not become deactivated as rapidly as the catalysts of the prior art due to lower operating temperature and resistance of nitride formation.

The figure shows the preferred design for the reactor using our novel catalyst.

The reactor 10 is positioned in a furnace 11. The reactor is a cylindrical structure having gas inlets 12 and 13 and an outlet 14. The catalyst is suspended in the reactor at 15 over a suitable porous disk 16.

In operation, the reactor is brought up to temperature in the furnace and preheated methane, or nitrogen and methane if a diluent is required, are fed into the reactor at 12. Gaseous ammonia is fed into the reactor at 13. The reaction takes place in the catalyst bed 15 and the gaseous product passes out the exit tube 14 to a suitable collection vessel.

When the ammonia gas is passed into the system immediately above the catalyst bed, the yield of hydrogen cyanide remains constant over a protracted period of time. In addition, best results are obtained when the amount of methane is carefully controlled to assure there is an adequate amount of ammonia present to react with the methane at all times. If these precautions are followed, the tendency for the methane to be reduced to carbon is alleviated with the resultant increase in catalyst life.

The reactants are maintained in contact with the catalyst for periods of about 0.01 to 10 seconds, preferably about 4 seconds.

Although mullite is a naturally occurring mineral, it is desirable for obvious reasons to prepare the base synthetically. The method of preparing the base is not part of this invention. In one process, solutions of sodium silicate, aluminum nitrate, and sodium aluminate are prepared and intimately mixed. The mixture is spray dried and exchanged to remove sodium to a suitably low level. The spray dried product is then calcined to prepare the base.

The mullite base is then impregnated with a solution of a platinum salt. The preferred salt for the impregnation is chloroplatinic acid although other salts such as chloride, bromide, fluoride, and sulfate may be used. A sufficient quantity of the solution is added to prepare the catalyst having a platinum content of about 0.01 to 2 percent, preferably about 0.1 to 0.6 percent.

In the final step, the platinum is reduced to the metal by heating in a hydrogen atmosphere. Suitable reduction is achieved if the catalyst is heated to about 250 to 500° C. for about 1 to 6 hours, preferably about 500° C. for about 4 hours.

Our invention is further illustrated by the following specific but non-limiting examples.

EXAMPLE 1

This example illustrates a method of preparing the synthetic mullite base and the catalyst used in our novel process.

Three solutions A, B, and C were prepared as follows:
A total of 27.6 lbs. of sodium silicate and hydrate ($Na_2SiO_3 \cdot 5H_2O$) and 10.6 lbs. of sodium hydroxide were dissolved in 12.5 gal. of water. This solution was designated solution A.

Sodium aluminate was prepared by dissolving 9.82 lbs. of alumina trihydrate ($Al_2O_3 \cdot 3H_2O$) and 10.60 lbs. of sodium hydroxide pellets and 13.50 gal. of water. This soluion was designated solution B.

Solution C was a solution of 83.25 lbs. of aluminum nitrate ($Al(NO_3)_3 \cdot 9H_2O$) and 19.20 gal. of water.

The three solutions were mixed simultaneously with rapid stirring. Solution A was fed to the mixing vessel at a rate of 230 cc. per minute; solution B at a rate of 234 cc. per minute. The final product had a pH of 6.6 to 7. The solutions A and C were heated to 98° C. prior to mixing. The product was spray dried and washed. It was found to have a silica to alumina ratio of 0.792.

A 10 kg. portion of this spray-dried product was washed by slurrying the hydrogel with 6 gal. of water followed by filtration. A portion, 4100 grams, of the hydrogel was then ion exchanged with ammonium sulfate. The hydrogel was slurried three times for 15 minutes in three gal. portions of 5% ammonium sulfate solution heated to a temperature of 80–90° C. The hydrogel was washed between the exchanges with 5 gal. portions of water followed by two washings after the final ammonium sulfate treatment. The $Na_2O$ content of the product was reduced to 0.2%. The gel was then calcined at 1200° C. for 1½ hours. The product had a surface area of 73.5 square meters per gram. The crystallites, as calculated from X-ray line broadening, were about 1000 A. in size.

A sample of mullite, prepared in a manner similar to that described above having a surface area greater than 100 square meters per gram, was soaked in a 1% solution of chloroplatinic acid ($H_2PtCl_6 \cdot 6H_2O$) for a period of 60 hours. The supernatant liquid was decanted and the 2 millimeter cross section pellets were dried at 120° C. in vacuo. A ten cc. sample of the material having a platinum content of 0.2% was charged to the quartz reactor tube. The sample was reduced in hydrogen flow at 500° C., for a period of 4 hours. The temperature was then increased to 970° C. and ammonia and methane were passed over the catalyst, the molar ratio being slowly increased to 1 to 1. The yield of hydrogen cyanide based on ammonia was 80.2% and on methane 82.5%.

EXAMPLE 2

This example illustrates the importance of controlling the initial flow of methane at a low level to insure optimum yields of hydrogen cyanide.

In this run, the catalyst was the mullite based catalyst prepared according to the method described in Example 1 with the exception that the catalyst was reduced at 500° C. in hydrogen for a period of 1½ hours. The run was continued for several days and the hydrogen cyanide yield was calculated periodically. The data collected in this run is set out in Table I below.

TABLE I

| Sample Number: | Hours on stream | Feed composition in cc. | | | HCN yield in percent |
|---|---|---|---|---|---|
| | | $CH_4$ | $NH_3$ | $N_4$ | |
| 1 | 1 | 6 | 35 | 79 | 83.0 |
| 2 | 4 | 6 | 35 | 79 | 89.5 |
| 3 | 23 | 6 | 35 | 79 | 93.7 |
| 4 | 24 | 12 | 35 | 73 | 84.3 |
| 5 | 25 | 12 | 35 | 73 | 85.8 |
| 6 | 30 | 12 | 35 | 73 | 82.1 |
| 7 | 50 | 18 | 35 | 67 | 85.0 |
| 8 | 52 | 18 | 35 | 67 | 87.7 |
| 9 | 55 | 24 | 35 | 61 | 87.7 |
| 10 | 56 | 30 | 35 | 55 | 79.6 |
| 11 | 82 | 30 | 35 | 55 | 85.2 |
| 12 | 98 | 30 | 35 | 55 | 84.2 |
| 13 | 120 | 34 | 35 | 52 | 81.0 |
| 14 | 122 | 34 | 35 | 52 | 80.3 |
| 15 | 125 | 34 | 35 | 52 | 82.5 |

It is apparent from these data that the catalytic activity of our novel catalyst is maintained for protracted periods of time. When the amount of methane added is increased slowly, the yield of hydrogen cyanide will still be in the order of 80% after 125 hours of operation. In contrast, a catalyst on the alumina base lost essentially all of its activity after only 2 hours of operation.

EXAMPLE 3

This example illustrates the problems encountered with alumina as the base for the catalyst.

A sample of alumina trihydrate ($Al_2O_3 \cdot 3H_2O$) was coated with platinum using the techniques described in Example 1 above and reduced at 500° C. in hydrogen. A 10 cc. portion of this catalyst was transferred to the quartz reactor described above and subjected to a flow of methane, ammonia and nitrogen sweep gas. The reactor was heated to 1000° C. and the hydrogen cyanide yield, based on ammonia, was checked periodically. The data collected in this series of runs is set up in the table below.

TABLE II

| Sample Number: | Minutes on stream | Feed composition in cc. | | | HCN yield in percent |
|---|---|---|---|---|---|
| | | $CH_4$ | $NH_3$ | $N_4$ | |
| 1 | 15 | 6 | 35 | 79 | 38 |
| 2 | 30 | 6 | 35 | 79 | 49.6 |
| 3 | 45 | 6 | 35 | 79 | 51.3 |
| 4 | 60 | 6 | 35 | 79 | 46.4 |
| 5 | 75 | 6 | 35 | 79 | 47.9 |
| 6 | 90 | 12 | 35 | 73 | 45.6 |
| 8 | 120 | 35 | 35 | 50 | 25.3 |

It is apparent from these data that the catalyst became deactivated after only 2 hours on stream. The maximum yield was recovered after 45 minutes on stream. The methane to ammonia feed ratio was maintained at an initial low level and gradually increased. However, because of the apparent formation of the aluminum nitride and severe carbonation of the catalyst, the yield of hydrogen cyanide decreased to only 25% after 2 hours of operation.

EXAMPLE 4

The sample of mullite prepared according to the process described in Example 1 was tested for catalytic activity.

Ten cc. of the mullite was pressed at 10,000 p.s.i. and broken into particles of about 1 millimeter in size. The particles were charged into a quartz reactor. The material was exposed to ammonia atmosphere for 16 hours at 1000° C. Methane was then passed into the system and the reactor operated with a 1:1 mixture of methane and ammonia, converting only a small portion to hydrogen cyanide. However, the surface area of the mullite was retained and no carbonation of the catalyst was experienced.

The fact that no appreciable amount of HCN was produced when unplatinized mullite is employed show conclusively that platinum is essential in catalysts of the reaction.

EXAMPLE 5

A sample of catalyst was prepared in which the platinum content of the mullite base was increased from 0.3% to 2% and the effect on the yield of hydrogen cyanide noted.

In this run, a solution of 0.26 gram of chloroplatinic acid ($H_2PtCl_5 \cdot H_2O$) and 5 ml. of water was adsorbed on a mullite base such that the platinum constituted 2% by weight of the catalyst. The volume of the solution was equal to the pore volume of the mullite. The material was vacuum dried at 120° C., charged into the reactor and reduced in hydrogen using the techniques described in Example 1 above. As in the previous runs, the temperature was maintained at 1000° C. A comparison of the HCN yield with this catalyst and the catalyst of Example 1 is shown in Table III below.

TABLE III

| Sample Number: | Time on stream | CH₄ feed in cc. min. | HCN yield 2% Pt on mullite | HCN yield 0.3% Pt on mullite |
|---|---|---|---|---|
| 1 | 2 | 12 | 75 | 81 |
| 2 | 15 | 12 | 75 | 98 |
| 3 | 19 | 12 | 74 | 91 |
| 4 | 33 | 12 | 71 | 88 |
| 5 | 41 | 12 | 24 | 85 |

It is apparent from review of these data that increasing the platinum level of the catalyst to 2% has a negative effect. This is explained by the inability to get proper distribution of the platinum on the mullite base using the higher concentration of platinum. The platinum apparently accumulates in certain areas and tends to sinter, thus causing the catalyst to lose its activity. After 41 hours on stream, the catalyst containing 2% platinum had essentially failed, whereas the catalyst containing 0.3% platinum still gave yields in excess of 80% conversion.

Obviously, many modifications and variations of the invention may be made without departing from the essence and scope thereof and only such limitations should be applied as are indicated in the appended claims.

What is claimed is:
1. A process for preparing hydrogen cyanide by the gas phase reaction of methane and ammonia at a temperature of about 1000° C., the improvement comprising carrying out said reaction in the presence of a catalyst consisting essentially of a coating of platinum on a high surface area refractory mullite base.
2. The process according to claim 1 wherein the mullite is coated with platinum metal in an amount equal to less than 2 weight percent of the catalyst.
3. The process according to claim 1 wherein the reactants are in contact with the catalyst for about 0.01 to 10 seconds.

References Cited
UNITED STATES PATENTS 2,768,876  10/1956  Wagner _____ 23—151
2,849,378  8/1958  Baker et al. _____ 252—460

OSCAR R. VERTIZ, Primary Examiner

H. S. MILLER, Assistant Examiner

U.S. Cl. X.R.

23—288; 252—460